US006791617B1

(12) United States Patent
Nakamura (10) Patent No.: US 6,791,617 B1
(45) Date of Patent: Sep. 14, 2004

(54) DISTANCE DETECTING DEVICE AND A METHOD FOR DISTANCE DETECTION

(75) Inventor: Kenji Nakamura, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/275,033

(22) Filed: Mar. 24, 1999

(30) Foreign Application Priority Data

Mar. 25, 1998 (JP) .......................................... 10-076866

(51) Int. Cl.[7] ........................ H04N 5/232; G03B 17/00; G03B 13/34
(52) U.S. Cl. ........................ 348/345; 348/349; 396/50; 396/121
(58) Field of Search ................................ 348/348, 345, 348/349; 396/50, 121, 120

(56) References Cited

U.S. PATENT DOCUMENTS

| | | | | |
|---|---|---|---|---|
| 4,296,316 A | * | 10/1981 | Tsuji et al. .................. | 250/204 |
| 5,051,833 A | * | 9/1991 | Tsuji .......................... | 348/349 |
| 5,311,004 A | * | 5/1994 | Kusaka ....................... | 396/121 |
| 5,485,004 A | * | 1/1996 | Suzuki et al. ............. | 250/208.2 |
| 5,499,074 A | * | 3/1996 | Ohsawa et al. ............ | 396/50 |
| 5,539,462 A | * | 7/1996 | Lee et al. ................... | 348/349 |
| 5,654,790 A | | 8/1997 | Uchiyam | |
| 5,739,857 A | * | 4/1998 | Kaneda ...................... | 348/349 |
| 5,909,597 A | * | 6/1999 | Hasushita .................. | 396/111 |
| 6,094,223 A | * | 7/2000 | Kobayashi ................. | 348/345 |
| 6,285,831 B1 | * | 9/2001 | Hara .......................... | 396/50 |
| 6,362,852 B2 | * | 3/2002 | Ito ............................. | 348/345 |
| 6,657,668 B1 | * | 12/2003 | Hata ........................... | 348/349 |

FOREIGN PATENT DOCUMENTS

JP          6-250075          9/1994

* cited by examiner

Primary Examiner—Andrew Christensen
Assistant Examiner—Nhan Tran
(74) Attorney, Agent, or Firm—Burns, Doane, Swecker & Mathis, L.L.P.

(57) ABSTRACT

A distance detecting device comprising an optical system, a pair of image sensors having a plurality of pixels which receives light flux from a photographic subject through said optical system, a distance calculator which calculates the distance to a photographic subject 3 from the image information of a region of the image sensors, and an posture detector detects the posture of the distance detecting device, wherein the distance to a photographic subject is detected from image information of the measurement region which is set such that the length of the region in the vertical direction is longer than the length in the horizontal direction relative to the normal ground surface and in accordance with the posture of the distance detecting device.

10 Claims, 7 Drawing Sheets

DISTANCE DETECTING DEVICE AND A METHOD FOR DISTANCE DETECTION

This application is based on Application No. 10-76866 filed in Japan, the content of which is hereby incorporated by reference.

BACKGROUND OF THE INVENTION

1. Field of the Invention

The present invention relates to a distance detecting device for detecting the distance to a photographic subject for use in a camera, video camera, still video camera and the like.

2. Description of the Related Art

Distance detecting devices of the passive type used in cameras and the like condense light via a pair of optical systems to condense the light flux from a photographic subject, and form images on a pair of image sensors such as an area sensor or the like arranged in the rear of the optical system. Information expressing luminance distribution of a specific area on both image sensors is extracted to detect the distance to the photographic subject from the difference in the extracted luminance distributions via the principle of trigonometric survey.

When using the aforesaid method under low contrast conditions, however, the reduced distance detection accuracy results in inaccurate measurement. In order to eliminate this problem, methods have been proposed for increasing the area of the image on the image sensor from which the image information is extracted so as to enable distance detection of a photographic subject under low contrast conditions.

Figure 1A:
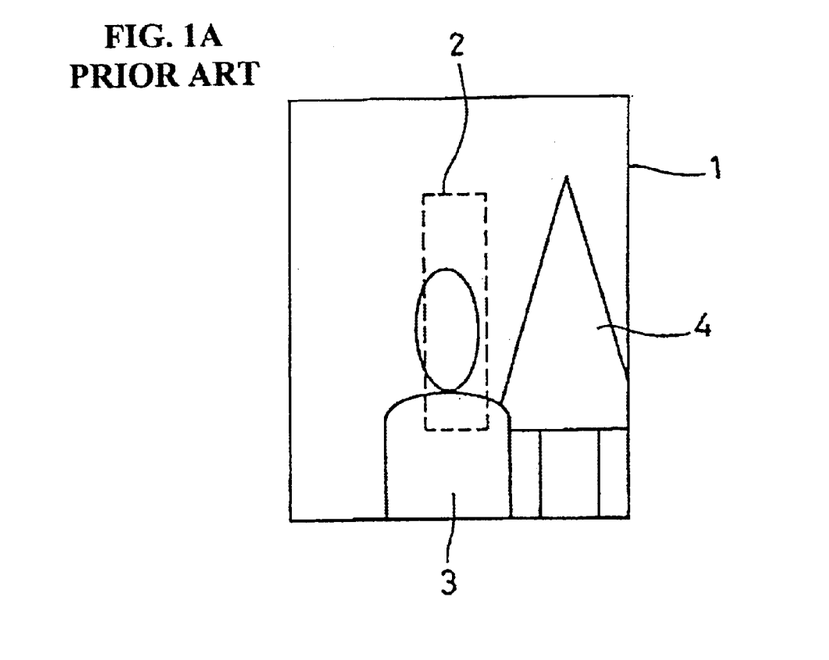
FIGS. 1A and 1B show the measurement regions of a conventional distance detecting device.
Figure 1B:
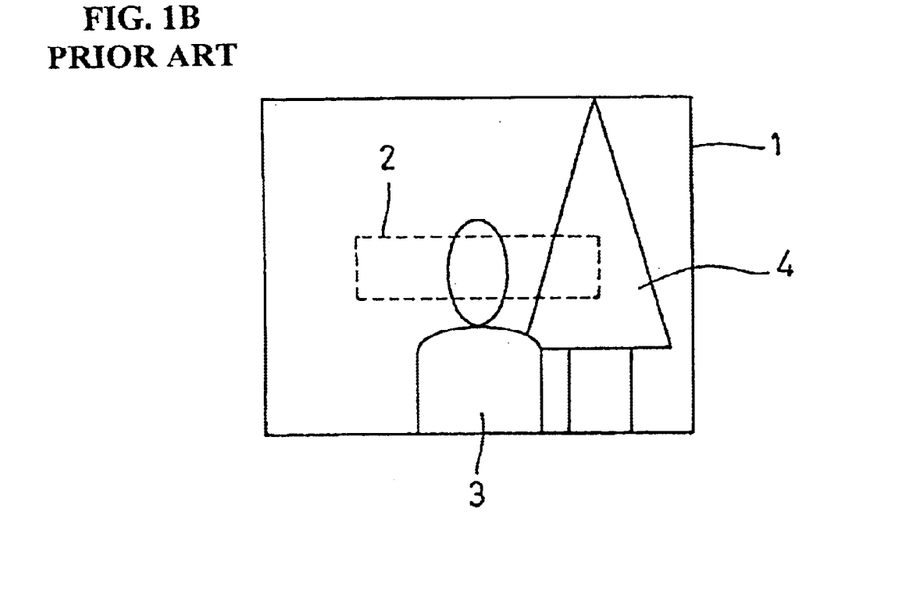

When this method is used in a camera, it is possible to accurately measure distance of a photographic subject under low contrast conditions by, for example, orienting the photographic plane 1 with the vertical length, and enlarging the area of a region (hereinafter referred to as the "measurement region") 2 used for distance detection on the image sensor corresponding to the photographic plane 1, as shown in FIG. 1A. However, the measurement region 2 may be set as the horizontal length when the photographic plane 1 is oriented in the horizontal direction by changing the orientation of the camera, as shown in FIG. 1B.

With this method the distance measurement accuracy is reduced when the background 4 outside of the photographic subject 3 within the photographic plane 1 intrudes into the measurement region 2, and the luminance distribution information of the non-photographic subject region is also used in the distance detecting calculation. Even if the photographic plane 1 is set in the horizontal direction and the measurement region 2 is set in the vertical length, when the photographic plane 1 is set in the vertical direction, a similar disadvantage arises since the measurement region 2 is horizontal length.

SUMMARY OF THE INVENTION

An object of the present invention is to improve the distance detection accuracy relative to a photographic subject under low contrast conditions.

Another object of the present invention is to provide a distance detecting device which does not produce degrading of the distance detecting accuracy due to background or foreground.

These objects are attained by providing a distance detecting device comprising: an optical system which forms an image of a photographic subject; an image sensor having a plurality of pixels which receive light flux from a photographic subject through said optical system; an extraction circuit which extracts image information of a specific region of said image sensor; a distance calculator which calculates the distance to a photographic subject from the image information of a region extracted by the extraction circuit; a detector which detects the posture of the distance detecting device; and a changer which changes a shape of the specific region in accordance with posture detected by the detector.

According to this construction, the light flux from a photographic subject passing through the optical system impinges the image sensor, and the shape of the measurement region is set on the image sensor in accordance with the posture of the distance detecting device when said posture is changed. The distance to a photographic subject is calculated by the distance calculator via the difference in the luminance distributions of the measurement regions.

The said specific region is longer in a vertical direction than a horizontal direction.

According to this construction, the measurement region is normally longer in a vertical direction than a horizontal direction when the posture of the distance detecting device is changed.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 2:
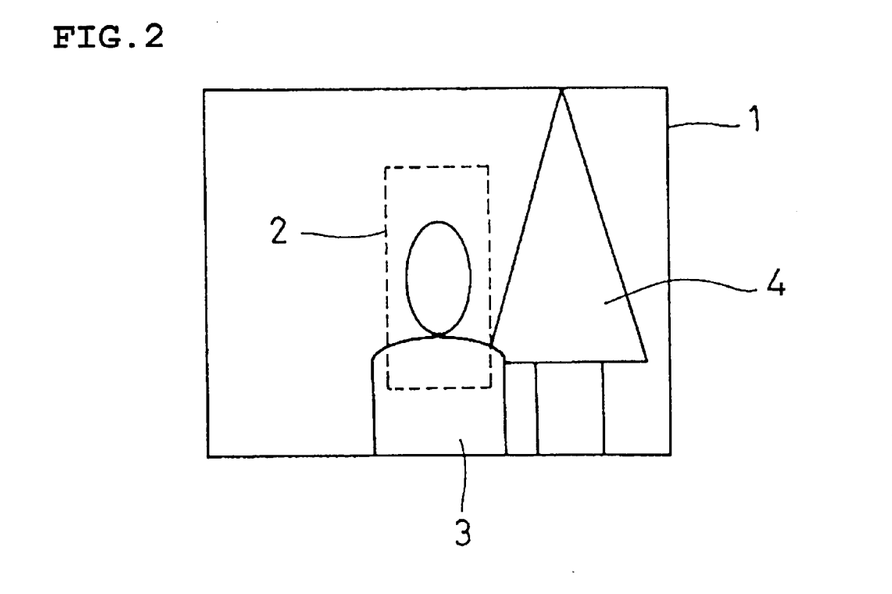
FIG. 2 shows the measurement region of the distance detecting device of a first embodiment of the present invention.

FIG. 2 shows a first embodiment of the present invention, and parts in common with the device shown in FIG. 1 are designated by like reference numbers. FIG. 2 shows an image within a photographic plane 1 receiving light by an image sensor such as an area sensor or the like in a distance detecting device installed in a camera. In the same drawing, the posture of the camera is horizontal, and the photographic plane 1 is in the horizontal length.

At this time, the measurement region 2 is set in a vertical-length rectangular shape, and distance detection can be accomplished without influence by the background (or foreground) 4 since only the photographic subject 3 is present within the measurement region 2. In general, there is only a slight possibility that the foreground or background 4 will impinge within the measurement region 2 even when the measurement region 2 is vertical since the main photographic subject 3 is most often a person. Even when the main photographic subject 3 is an object, the distance detection accuracy does not degrade since the distance to the main photographic subject 3 is the same when the measurement region 2 is vertical. Furthermore, since the measurement region 2 has a large area such that information is obtained from a large number of pixels, it is possible to maintain the accuracy of the distance detection of a photographic subject even under low contrast conditions.

When the measurement region 2 is set in a vertical-length rectangular shape, degradation of the distance detection accuracy is caused by an object is in the background of the main photographic subject in a horizontal orientation or a low wall is present in the foreground of the main photographic subject or the like. However, such degrading of the distance detection accuracy can be prevented by a user who manually changes the measurement region because the user will understand beforehand that the background or foreground intrudes into the measurement region since, for example, the measurement region is displayed beforehand in the viewfinder. Although the operation of manually changing the measurement region is complex, the camera operation can be simplified by setting the measurement region 2 to the vertical length as a standard since the circumstances of the photographic subject in such cases is normally minimal.

Figure 3:
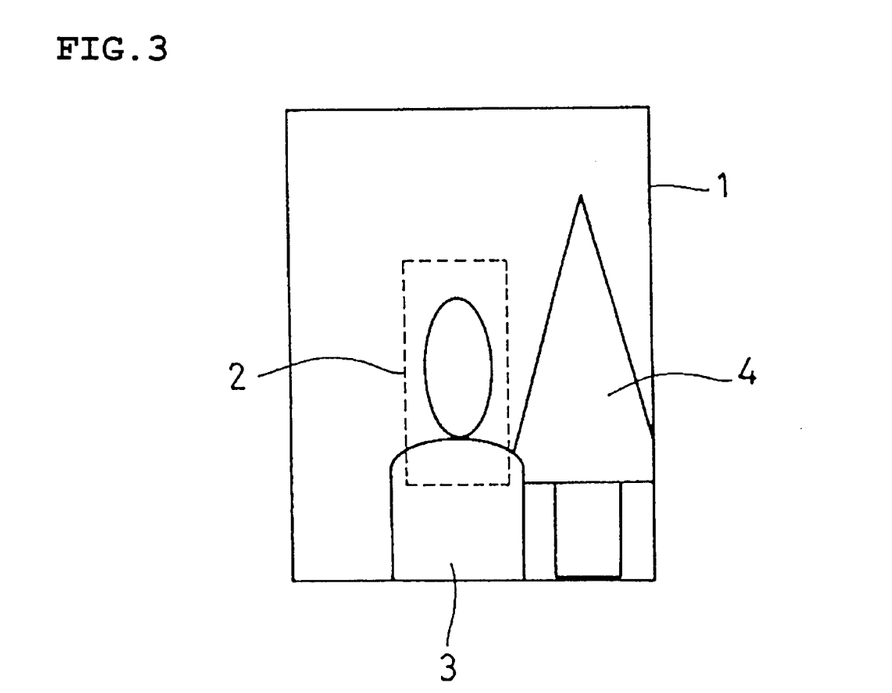
FIG. 3 shows the measurement region when the posture is changed for the distance detecting device of the first embodiment of the present invention.

As shown in FIG. 3, the measurement region 2 is set in a vertical-length rectangular shape even when the camera is inclined 90° in the vertical direction to orient the photographic plane 1 vertically. In this way, distance detection is accomplished without the influence of the background 4 since only the main photographic subject 3 is present within the measurement region 2.

Figure 10:
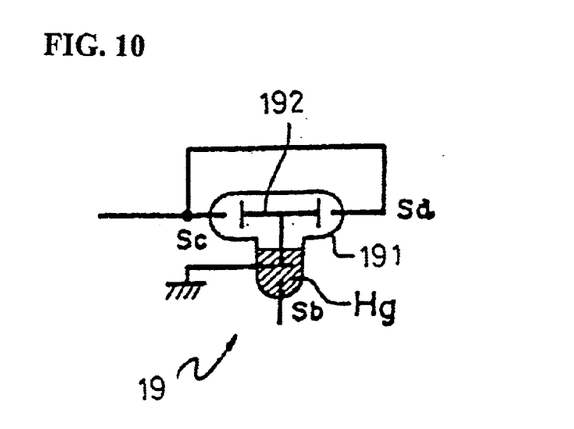
FIG. 10 shows an example of a detector which detects the posture of the distance detecting circuit of the present invention.

The change in the posture of the camera is detected by the posture detector, and the shape of the measurement region 2 is changed. The posture detector may comprise a means using a mercury switch or the like for detection, such as shown in FIG. 10. FIG. 10 shows the camera in a horizontal state, with a suitable amount of an electrically conductive fluid such as mercury Hg or the like sealed in a T-shaped sealed container 191.

Furthermore, pins Sa through Sc are provided on each end of the T-shaped sealed container 191. A common lead 192 is provided within the T-shaped sealed container 191 at a slight distance from the pins Sa through Sc. In the state shown in the drawing, the pin Sb and the common lead 192 are connected via the mercury Hg, such that pin Sb becomes grounded and the camera is detected in the horizontal state (i.e., normal horizontal position). A lead wire connected the pins Sa and Sc, such that the vertical condition (i.e., vertical position) of the camera can be detected regardless of whether the camera is rotated left or right.

Figure 4:
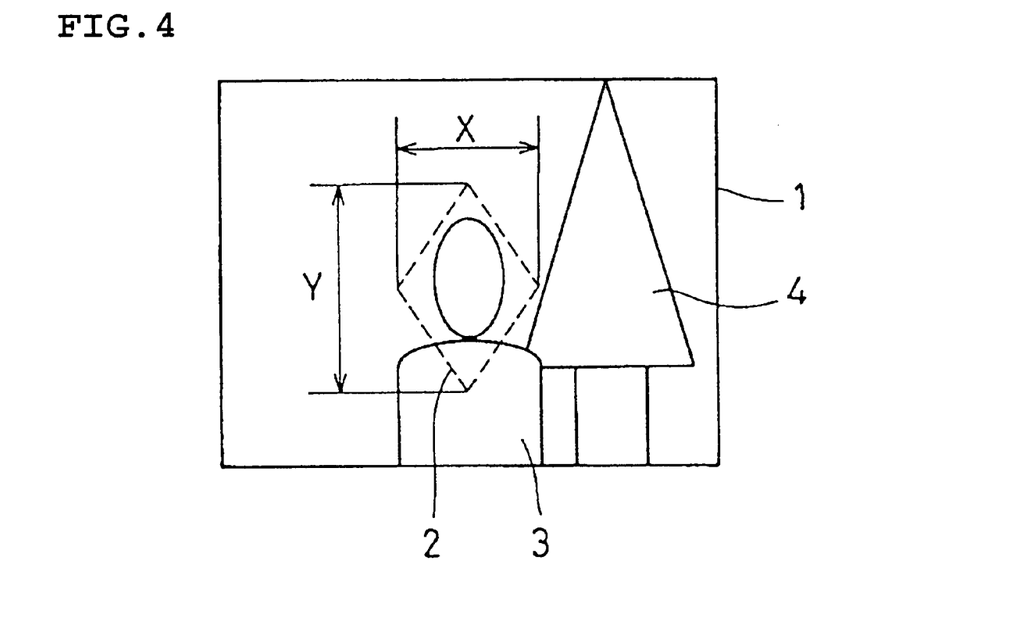
FIG. 4 shows the measurement region of the distance detecting device of a second embodiment of the present invention.

FIG. 4 shows a second embodiment of the present invention, and parts in common with the device shown in FIG. 1 are designated by like reference numbers. As shown in FIG. 4, even when the measurement region 2 does not have a rectangular shape, the shape of the measurement region 2 is such that the length Y in the vertical direction is longer than the length X in the horizontal direction to achieve an effectiveness similar to that of the first embodiment.

Figure 5:
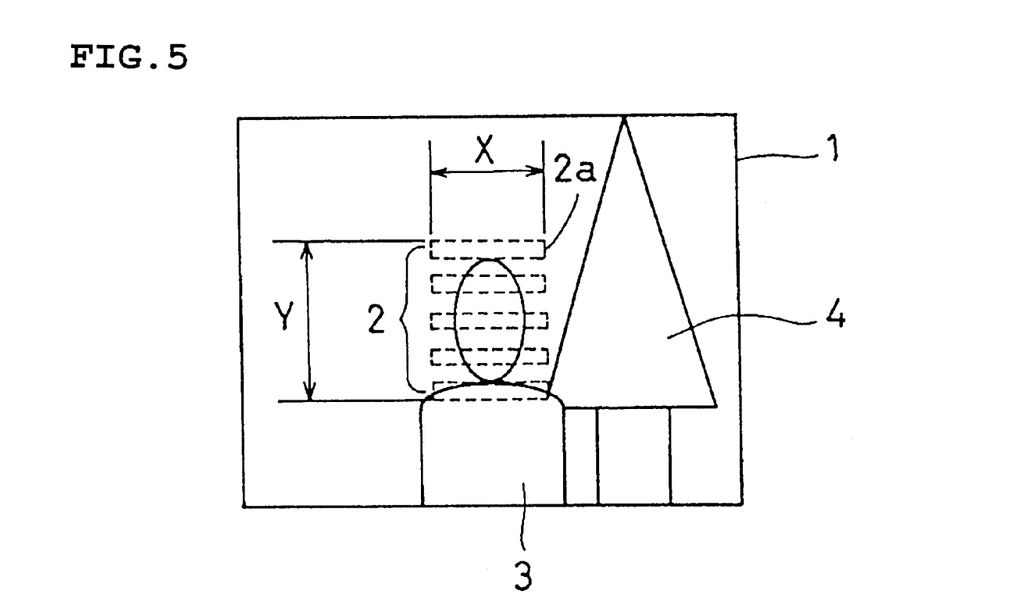
FIG. 5 shows the measurement region of the distance detecting device of a third embodiment of the present invention.
Figure 6:
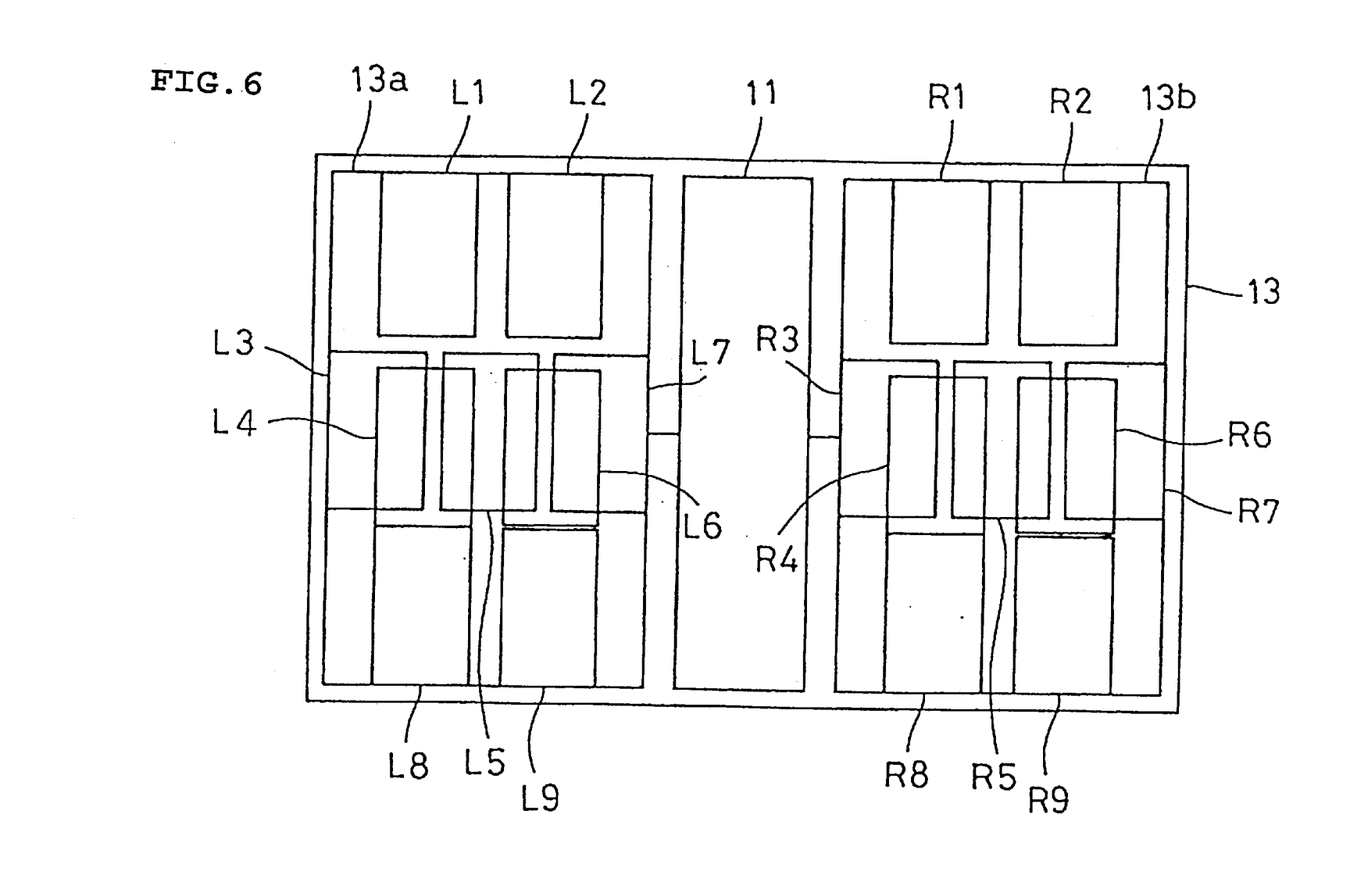
FIG. 6 shows the measurement region of the distance detecting device of a fourth embodiment of the present invention.

FIG. 5 shows a third embodiment of the present invention, and parts in common with the device shown in FIG. 1 are designated by like reference numbers. As shown in FIG. 5, the measurement region 2 comprises a plurality of line sensors arrayed with a space therebetween, and the shape of the measurement region 2 is such that the length Y in the vertical direction is longer than the length X in the horizontal direction to achieve an effectiveness similar to that of the first and second embodiments. Reference number 2a refers to the region in which image information is extracted by a single line sensor. Although the preceding description pertains to a measurement region arranged approximately in the center of the photographic plane, FIG. 6 shows a fourth embodiment. A plurality of measurement areas are provided within two area sensors 13a and 13b so as to be capable of distance detection even when the main photographic subject is not in the center of the photographic plane. In the same drawing, the area sensors 13a and 13b are shown arranged horizontally, and measurement regions L1 and L9, and R1 and R9 are respectively provided for measuring the distance to a photographic subject.

The controller 11 generates a transmission clock signal to transmit the information of all regions of the area sensors 13a and 13b to the previously mentioned extraction unit. The measurement regions from which image information is extracted are provided at nine locations relative to one area sensor. In this state, a measurement region containing a main photographic subject is detected. Then, the distance to a photographic subject is detected based on the principle of trigonometric survey via the information from the detected measurement region (e.g., L5) and the information from the corresponding measurement region (e.g., R5) of the other area sensor.

Furthermore, when the main photographic subject is within a specific measurement region and the background is in another measurement region, the distance detection result of the measurement region containing the main photographic subject can be extracted by methods such as selecting the nearer distance from among both distance detection results, or selecting the distance within a predetermined range and the like.

Degrading of the distance detection accuracy is also prevented in the fourth embodiment by reducing the possibility that a background may enter the same measurement region as a main photographic subject by setting the measurement region to vertical length. Distance detection accuracy is maintained even when the photographic subject is under low contrast conditions since the measurement region has a wide area.

Figure 7:
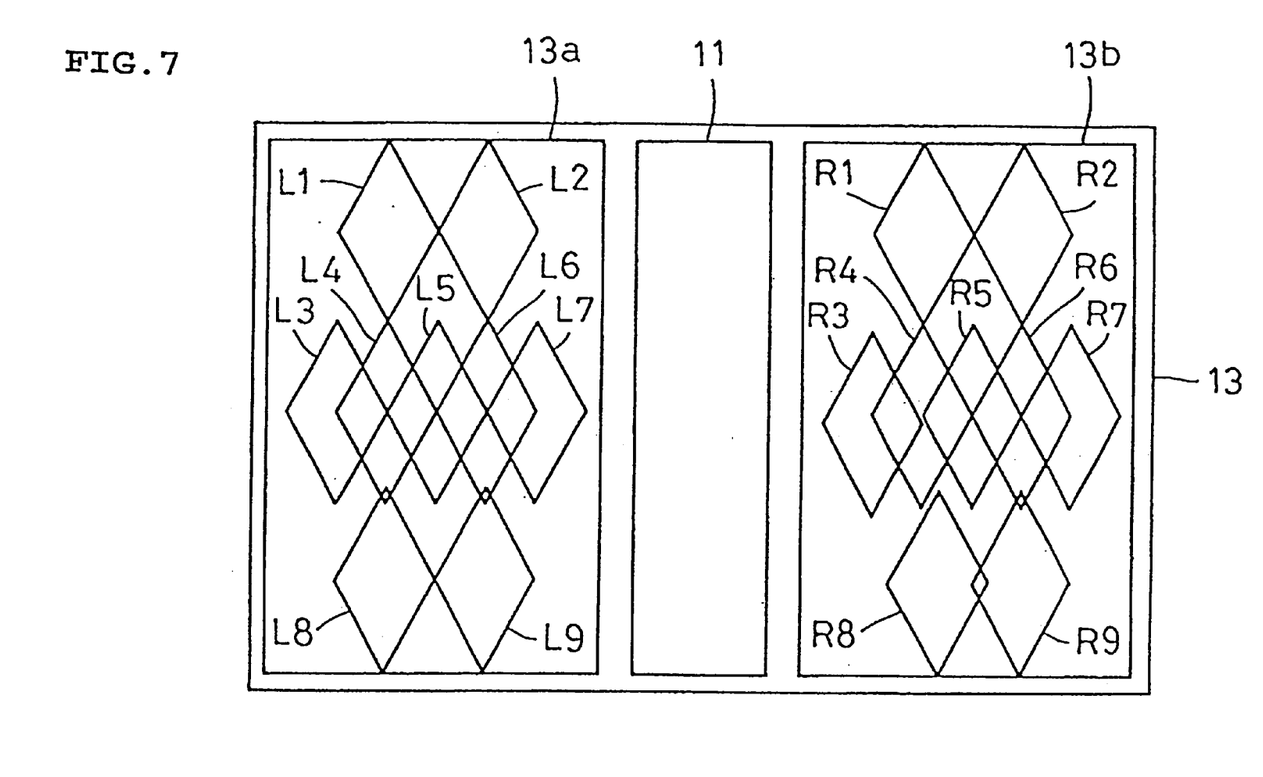
FIG. 7 shows the measurement region of the distance detecting device of a fifth embodiment of the present invention.
Figure 8:
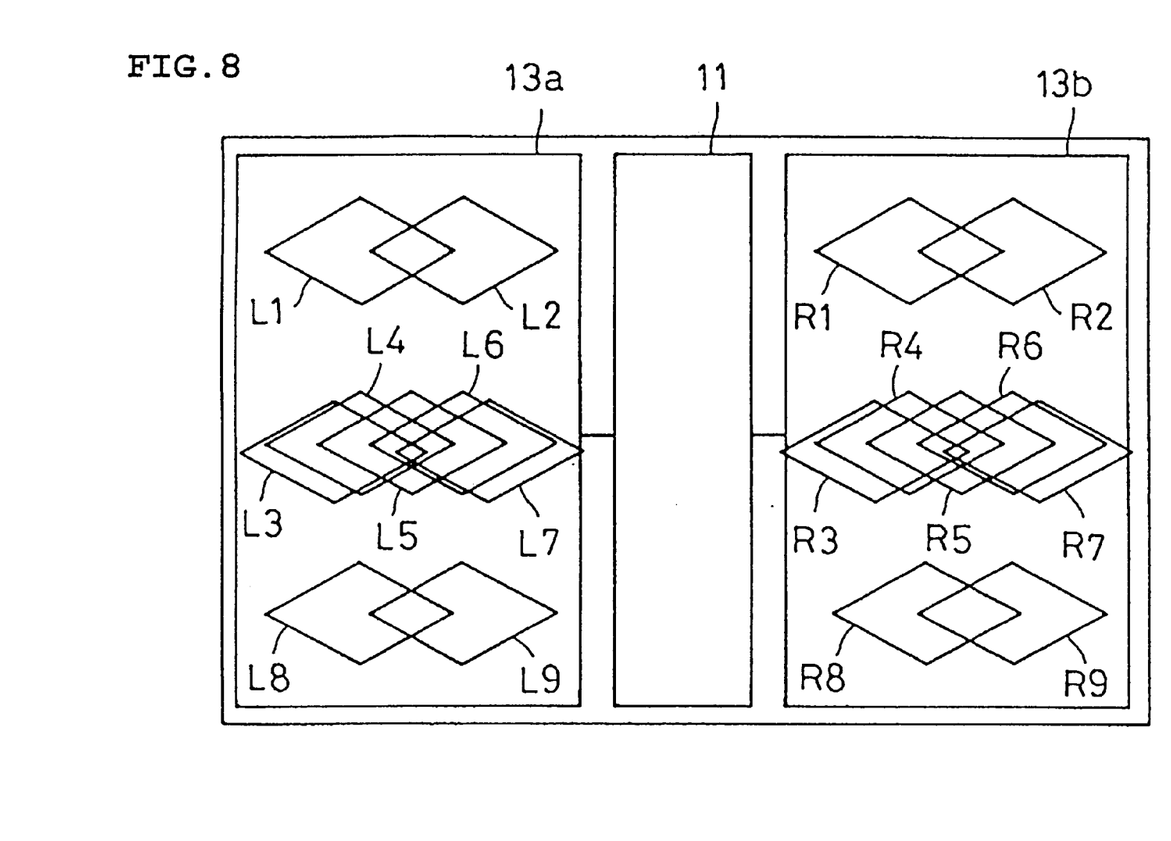
FIG. 8 shows the measurement region when the posture is changed for the distance detecting device of the fifth embodiment of the present invention.

FIG. 7 shows a fifth embodiment wherein the measurement regions are set to non-rectangular shapes within the two area sensors 13a and 13b. In FIG. 7, an effectiveness similar to that attained by the second embodiment shown in FIG. 4 is achieved by setting the length of the measurement region in the vertical direction longer than the length in the horizontal direction. FIG. 8 shows the shape of the measurement regions of the fifth embodiment with the camera is inclined 90° in the vertical direction. The posture of the distance detecting device is detected by a detector described above, so as to set the length of the measurement region in the vertical direction to be longer than the length in the horizontal direction.

The control method used when the distance detecting device of the present invention is installed in an image sensing device such as a camera and the like is described below with reference to FIG. 9. The image sensing device 10 is provided with a distance detecting device 20, a drive device 16, an image sensing optical system 15, and an image sensing means 17. The drive device 16 drives the image taking optical system 15 in the arrow A direction in accordance with the distance to the main photographic subject detected by the distance detecting device 20. In this way, the light flux from the main photographic subject passing through the image taking optical system 15 is focused on the image sensing means 17 to form an image.

The distanced detecting device 20 is provided with a pair of distance detecting optical units 12, such that the light flux that enters the distance detecting optical units 12 forms an image on the image sensors 21*an* and 21*b*. The image information of all pixels of the image sensors 21*a* and 21*b* are transmitted to the extraction unit 18 via the transmission signal generated by the controller 11. The posture detector 19 such as a mercury switch or the like detects whether the posture of the device is vertical or horizontal, and transmits this information to the extraction unit 18 to set the shape of the measurement region.

The extraction unit 18 extracts only information of the measurement region from the information transmitted from the image sensors 21*a* and 21*b* via address specification, and this information is transmitted to a microcomputer 14 provided with a distance calculator. The microcomputer 14 detects the presence of the main photographic subject and calculates the distance to the main photographic subject via the principle of trigonometric survey from the image information from the two image sensors 21*a* and 21*b*. The drive device 16 is controlled in accordance with the distance to the main photographic subject detected by the microcomputer 14.

Figure 9:
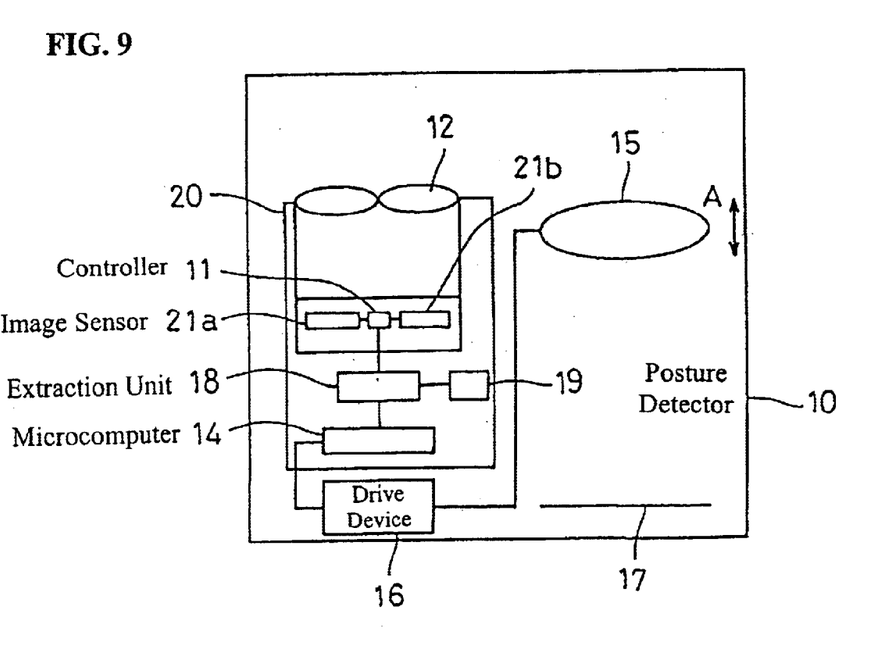
FIG. 9 is a block diagram showing the control method of the image sensing device using the distance detecting device of the present invention.

Although the construction of FIG. 9 shows a distance detection optical unit of the so-called external light passive type which differs from the image taking optical system, it is to be understood that the device is not limited to this construction and that a so-called TTL (through the lens) type system may be used to calculate the distance using light passing through the image taking optical system.

The present invention as described above provides that a distance detecting device calculates the distance to a photographic object by setting the measurement regions of the image sensor to a predetermined shape in accordance with the posture of the distance detecting device when the posture of the distance detecting device in a camera has changed.

The present invention improves the distance detection accuracy relative to a photographic subject under low contrast conditions and prevents the distance detection accuracy from degrading due to background and foreground.

The present invention provides that a distance detecting device calculates the distance to a photographic object by setting the measurement regions of the image sensor to a vertical length in accordance with the posture of the distance detecting device when the posture of the distance detecting device in a camera has changed.

The present invention improves the distance detection accuracy relative to a photographic subject under low contrast conditions and prevents the distance detection accuracy from degrading due to background and foreground when the main photographic subject is a person or the like having a vertical length as is most often the photographic situation.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A distance detecting device comprising:
    an optical system which forms an image of a photographic subject;
    a two-dimensional area image sensor having a plurality of pixels in a grid extending in two directions which receive light flux from a photographic subject through said optical system;
    an extraction circuit which extracts image information of a specific region of said area image sensor;
    a distance calculator for calculating the distance to a photographic subject from the image information of a region extracted by the extraction circuit;
    a detector which detects a posture of the distance detecting device; and
    a changer which changes a shape of the specific region in accordance with posture detected by the detector.

2. A distance detecting device as claimed in claim 1, wherein said specific region is longer in a vertical direction than a horizontal direction.

3. A distance detecting device as claimed in claim 1, wherein said area image sensor is a pair of area sensors.

4. A distance detecting device as claimed in claim 2, wherein said specific region is a rhombus shape.

5. A distance detecting device as claimed in claim 1, wherein said extraction circuit extracts a region containing a main photographic subject.

6. A distance detecting device as claimed in claim 1, wherein said extraction circuit extracts image information of a plurality of regions of said area image sensor, and said distance calculator calculates the distance to the photographic subject based on the plurality of image information.

7. A distance detecting device as claimed in claim 1, wherein said changer changes the shapes of a plurality of specific regions in accordance with posture detected by the detector.

8. A distance detecting device as claimed in claim 1, wherein said detector is a mercury switch.

9. A method for distance detection used in a distance detection device, comprising the steps of:
    receiving light flux from a photographic subject by a two-dimensional area image sensor having sensor elements in a grid extending in two directions;
    detecting a posture of the distance detecting device;
    extracting image information of a specific region of said area image sensor;
    calculating the distance to the photographic subject from the image information of said region; and
    changing a shape of the specific region in accordance with posture of the distance detecting device.

10. An image sensing device comprising:
    an optical system for forming an image of a photographic subject;
    a two-dimensional area image sensor having a plurality of pixels in a grid extending in two directions for receiving light flux from a photographic subject through said optical system;
    an extraction circuit for extracting image information of a specific region of said area image sensor;
    a distance calculator for calculating the distance to a photographic subject from the image information of a region extracted by the extraction circuit;
    a detector for detecting a posture of the distance detecting device; and
    a changer for changing a shape of the specific region in accordance with posture detected by the detector.

* * * * *